(12) United States Patent
Souza

(10) Patent No.: US 7,779,754 B2
(45) Date of Patent: Aug. 24, 2010

(54) METHOD AND APPARATUS FOR A CANNED FOOD PRESSING DEVICE

(76) Inventor: William J. Souza, 47 Lapham St., Fall River, MA (US) 02721

( * ) Notice: Subject to any disclaimer, the term of this patent is extended or adjusted under 35 U.S.C. 154(b) by 1072 days.

(21) Appl. No.: 11/487,635

(22) Filed: Jul. 17, 2006

(65) Prior Publication Data

US 2007/0031548 A1 Feb. 8, 2007

Related U.S. Application Data

(60) Provisional application No. 60/699,534, filed on Jul. 15, 2005.

(51) Int. Cl.
*B30B 9/06* (2006.01)

(52) U.S. Cl. .............. 100/116; 100/110; 100/213; 100/219; 99/495; 99/506; D7/665

(58) Field of Classification Search .......... 100/99, 100/104, 110, 116, 125, 126, 213, 234, 243, 100/219, 265, 295; 99/495, 501–513; 210/464, 210/470; D7/665, 666
See application file for complete search history.

(56) References Cited

U.S. PATENT DOCUMENTS

| | | | | |
|---|---|---|---|---|
| 3,995,544 A | * | 12/1976 | Farley | 100/116 |
| 4,860,647 A | * | 8/1989 | Kerslake | 100/234 |
| 5,320,031 A | * | 6/1994 | Whitney | 99/495 |
| 5,363,759 A | * | 11/1994 | D'Ambrosio | 100/110 |
| 5,372,063 A | * | 12/1994 | Berg | 100/110 |
| 6,234,074 B1 | * | 5/2001 | Mangum | 100/110 |
| 7,162,952 B1 | * | 1/2007 | Michaud | 100/110 |
| 7,293,502 B2 | * | 11/2007 | So | 100/234 |
| D567,036 S | * | 4/2008 | Coakley, Jr. | D7/665 |

\* cited by examiner

*Primary Examiner*—Jimmy T Nguyen

(57) ABSTRACT

A canned food pressing device includes a top piece, wherein the top piece is adapted to conform to the shape of a circular can and has multiple columns of vertically aligned gripping teeth. The top piece is also adapted to facilitate gripping and turning. The device also includes a bottom piece, having multiple columns of vertically aligned arcing teeth, wherein the vertically aligned arcing teeth are adapted to mate with the vertically aligned gripping teeth. The bottom piece is also adapted to facilitate gripping and turning. In addition, the bottom piece includes a magnet for lifting a magnetic can lid. Both the top piece and bottom piece also include alignment markers.

16 Claims, 6 Drawing Sheets

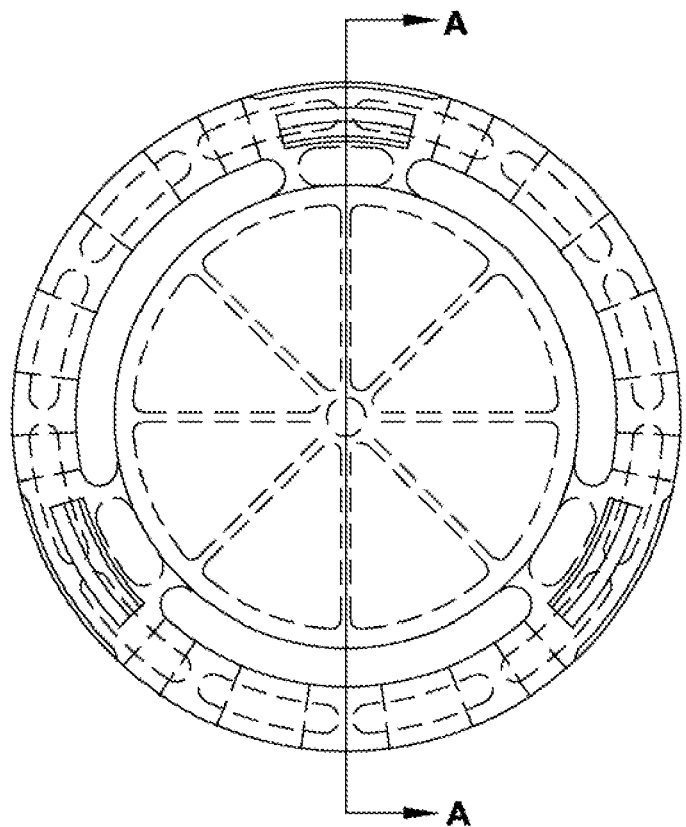
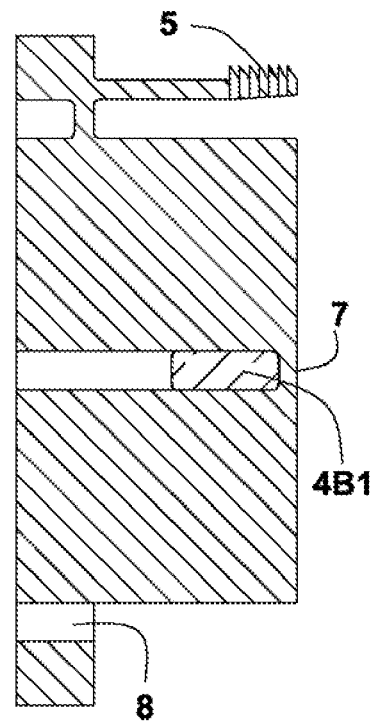
VIEW A-A
FIGURE 4A FIGURE 4B
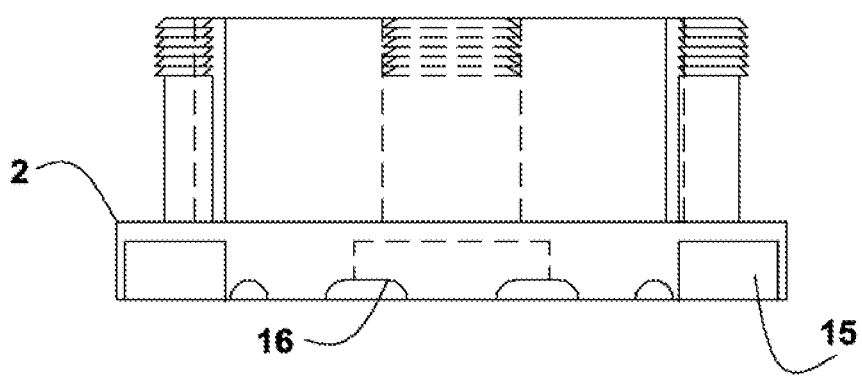
FIGURE 4C

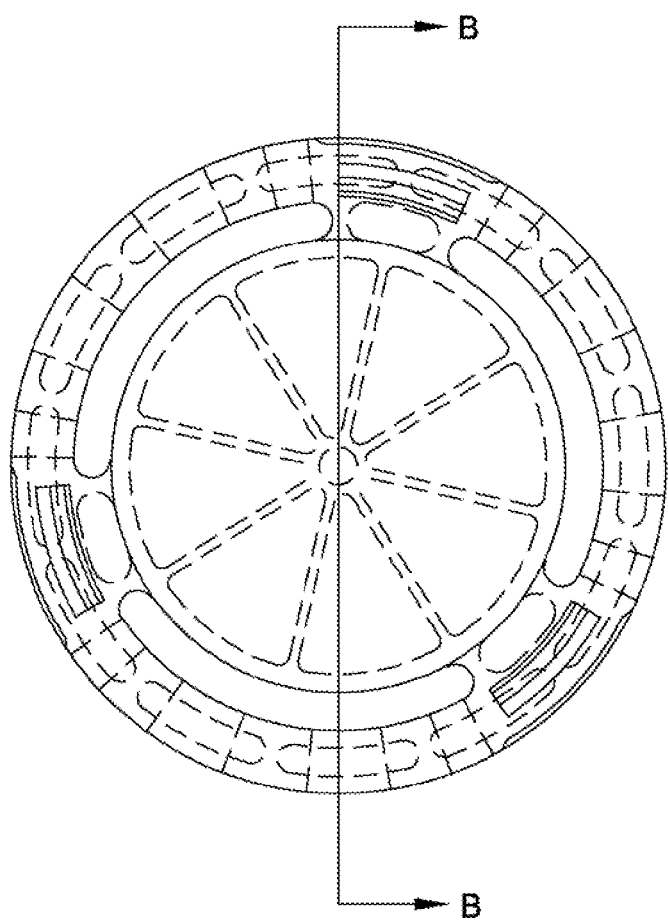 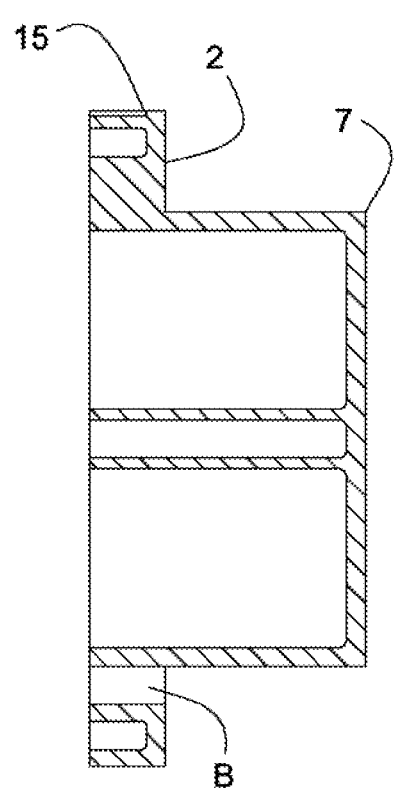
FIGURE 5A
FIGURE 5B

METHOD AND APPARATUS FOR A CANNED FOOD PRESSING DEVICE

This application claims the benefit of U.S. Provisional Application No. 60/699,534 filed Jul. 15, 2005, which is herein incorporated by reference in its entirety.

BACKGROUND OF THE INVENTION

1. Field of the Invention

This invention relates generally to devices that remove liquid from a food substance and, more particularly, to a stable device for draining liquid from canned goods in a single one-handed operation.

2. Description of Related Art

Many foods that are packaged in a can or other container either possess some liquid content or appropriate liquid is added during the packaging process. Tuna is an example of a food that is immersed in water or oil when it is packaged in a can for sale to consumers. A further consideration, addressed by the instant invention is that many canned solid foods, such as tuna, are, by the general public, believed to be packed in water or oil, this meaning, to the typical consumer, that the canned food is simply surrounded by the liquid. However, it has been found that most of the liquid within a can containing such a solid food product is retained by the product itself. That is, such a canned product is, typically, highly permeable so that the removal of water or oil from such a canned food is not simply a matter of opening the can and pouring off the excess liquid. Rather, it is necessary to, in some fashion, squeeze the excess liquid out of the product after the ambient liquid has been removed.

Various devices have been proposed for draining excess liquid from food that is packaged in a container. Although presumably effective, existing devices are not adapted for convenient or stable tabletop use or for single one-handed operation with low energy input, such as by people with disability or lack of normal dexterity.

Other straining devices heretofore devised and utilized for the purpose of removing water from food are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,995,544 to Farley discloses a tuna squeezer and strain utensil comprised of a cup shaped with a cylindrical wall for conforming to the internal diameter of a standard can. U.S. Pat. No. 5,372,063 to Berg and U.S. Pat. No. 5,320,031 to Whitney discloses additional food presses for forcing liquid from a can.

In practice, most consumers accomplish the above steps by first opening the can, pouring out the visible excess liquid, and then pushing down on the severed lid of the can while the can is placed over the sink. In this process, the can is typically inverted to facilitate a more efficient draining of the water therein. It has been found, as is recognized in other prior art (see for example U.S. Pat. No. 5,372,063 (1994) to Berg, entitled Press for Forcing Liquid from Canned Solid Food) that the above procedure usually causes the thin lid of the can to bend which, as a result, causes an uneven pressure against the food product. As such, a significant portion of the canning fluid, i.e., water, oil or suspension thereof including particles of the food with water and oil, will remain in the food product. This is a particular problem with persons having poor strength in the fingers to accomplish the above procedure. Further, such uneven pressure also causes the lid to bend which can be source of injury to the user. As well, the pressing of the preservative liquid from a can of canned solid food can impart undesirable odor to the fingers and hands of the user.

The prior art, in the instant area, as is best known to the inventor is reflected in U.S. Pat. No. 3,995,544 (1976) to Farley which is directed to a utensil defining a cup-shaped member that can fit within an open can and employs a perforated pressing wall portion that engages the contents of the can and squeezes the liquid therefrom through the perforations when the wall is forced into the can. The use of such a device is impractical for persons not having considerable manual dexterity.

The prior art is also reflected in the above-referenced U.S. Pat. No. 5,372,063 to Berg. This reference defines a complex device that is not cost-effective to manufacture and market and which, as in the case of said reference to Farley, requires a high degree of manual dexterity for the consumer to operate.

Other art in the instant area known to the inventor is U.S. Pat. No. 5,419,245 (1995) to Short, entitled Food Press Apparatus with Bias Press Plate. The reference to Short is one which was designed for institutional use, e.g., by restaurants, hotels and the like, in that it constitutes a large, bulky and expensive piece of machinery which is impractical for use in a domestic household.

It will be appreciated that the prior art described thus far requires either one or two handed pressing to remove the liquid from the can. However, as pointed out earlier, the liquid is often embedded within the food. Thus, the pressure must be maintained for some reasonable amount of time. This can be a difficult task for many people.

The instant invention accordingly may be viewed as a response to the above long-felt need in the art for a device, for the removal of canned liquid from can food products, which is particularly suitable for use by the domestic consumer and which does not require any particularly degree of manual dexterity for the operation thereof; is easy to manufacturer; and easy to clean.

It will also be appreciated that there is a long felt need in the art for a device more useful than previous art due to its alignment and discharge of fluids directly into the drain of a sink.

SUMMARY OF THE INVENTION

In accordance with one embodiment of the present invention a canned food pressing device is provided. The canned food pressing device includes a top piece, wherein the top piece is adapted to conform to the shape of a circular can, and wherein the top piece includes a plurality of vertically aligned row of gripping teeth. The device also includes a bottom piece which includes at least one compressor; and a plurality of vertically aligned arcing teeth. The plurality vertically aligned arcing teeth are adapted to mate with the at least one vertically aligned gripping teeth.

In accordance with another embodiment of the present invention a canned food pressing device is provided. The canned food pressing device comprises a top piece, wherein the top piece is adapted to conform to the shape of a circular can and has multiple internal columns of vertically aligned gripping teeth. The invention also includes a bottom piece, having multiple columns of vertically aligned arcing teeth, wherein the vertically aligned arcing teeth are adapted to mate with the at least one plurality of vertically aligned gripping teeth.

Another embodiment of the present invention is directed towards a canned food pressing device, The canned food pressing device comprises a top piece, wherein the top piece is adapted to conform to the shape of a circular can and has multiple columns of vertically aligned gripping teeth. The top piece is also adapted to facilitate gripping and turning. The invention also includes a bottom piece, having multiple columns of vertically aligned arcing teeth, wherein the vertically aligned arcing teeth are adapted to mate with the at least one plurality of vertically aligned gripping teeth. The bottom piece is also adapted to facilitate gripping and turning. In addition, the bottom piece includes a magnet for lifting a magnetic can lid. Both the top piece and bottom piece also include alignment markers.

BRIEF DESCRIPTION OF THE DRAWINGS

The foregoing aspects and other features of the present invention are explained in the following description, taken in connection with the accompanying drawings, wherein:

FIG. 4A is a top down internal view of the bottom piece shown in FIG. 1;

FIG. 4B is a cutaway view A-A corresponding to the A-A line shown in FIG. 4A;

FIG. 4C is a sideways pictorial view of the top piece shown in FIG. 1;

FIG. 5A is a top down internal view of the top piece shown in FIG. 1, rotated slightly from the view shown in FIG. 4A;

FIG. 5B is a cutaway view B-B corresponding to the B-B line shown in FIG. 5A.

DETAILED DESCRIPTION

Figure 1:
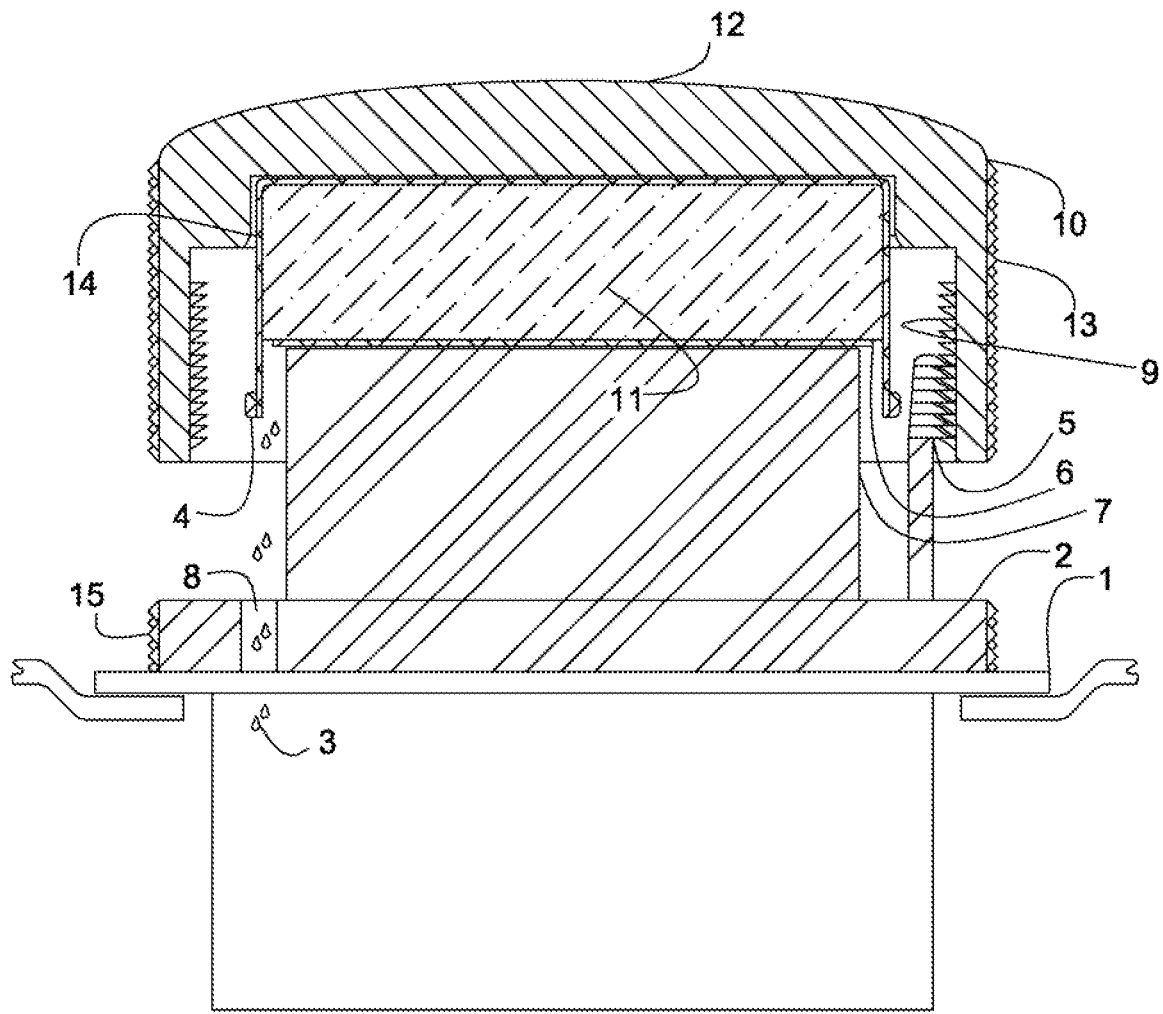
FIG. 1 is a cut away side view of various features of the invention in use.
Figures 2A, 2B:
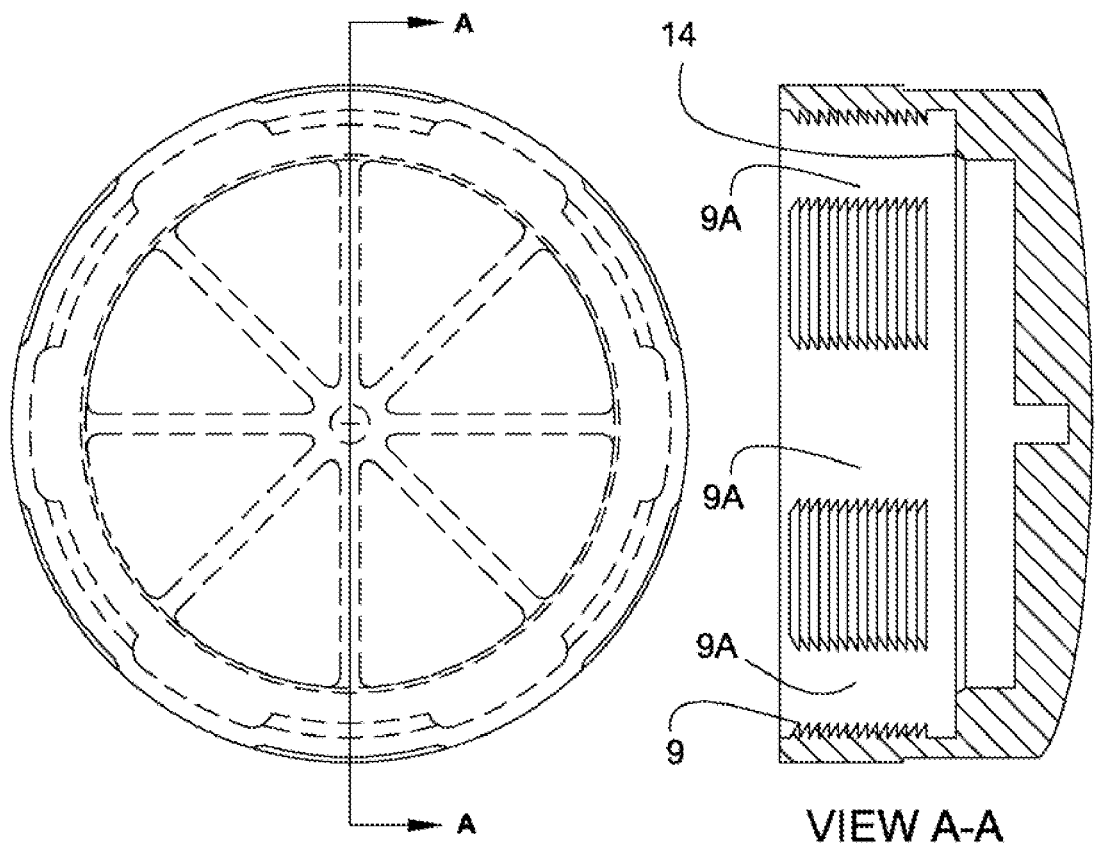
FIG. 2A is a top down internal view of the top piece shown in FIG. 1.
FIG. 2B is a cutaway view A-A corresponding to the A-A line shown in FIG. 2A.
Figure 2C:
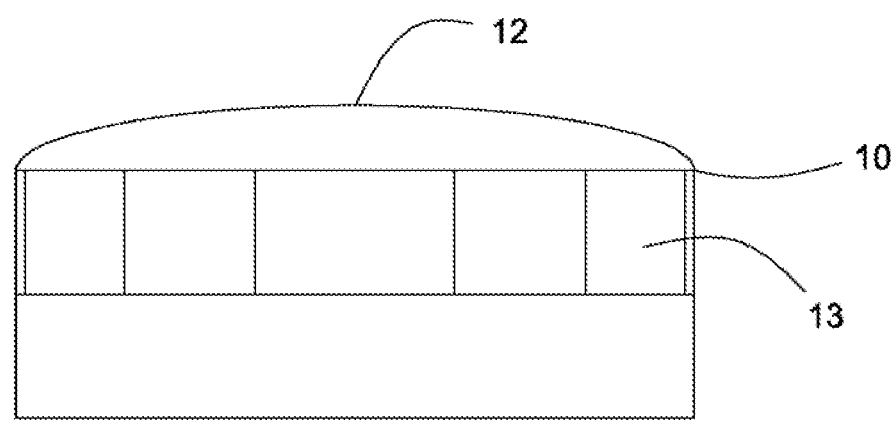
FIG. 2C is a sideways pictorial view of the top piece shown in FIG. 1.

Although the present invention will be described with reference to the embodiments shown in the drawings, it should be understood that the present invention could be embodied in many alternate forms of embodiments.

Referring to FIG. 1, the present invention is constructed in two separate cylinder shaped Teflon coated pieces, a top piece (10), and a bottom piece (2), both of the substantially same overall diameter of which is of the same size as a standard kitchen sink drain (1). It will be appreciated that any suitable material may be used. For example, the invention may be comprised of a suitable plastic or resin; which may then be of various pleasing colors and/or include advertising.

Still referring to FIG. 1, the top piece (10) is designed with specific attributes internally and externally. Externally the top piece has an elliptical shape on its top (12) for ergonomics while pressing on the device, a diamond knurl (13) on the circumference for gripping as well as positioning markers to identify release locations. It will be appreciated that the top piece (10) may be any suitable shape adapted to fit the human hand easily and comfortably. For example the top piece (10) may be scalloped shape around its circumference edge to provide gripping and mechanical leveraging. Internally the top piece may be designed with six positions of griping teeth (9) and six clearance positions (9A). Although, it will be appreciated that any suitable number of gripping teeth positions and corresponding clearance positions may be provided. Also, a cylinder shaped cavity (14) is incorporated into to the top piece to hold and align the can (4) while in use with the device.

Figures 3A, 3B:
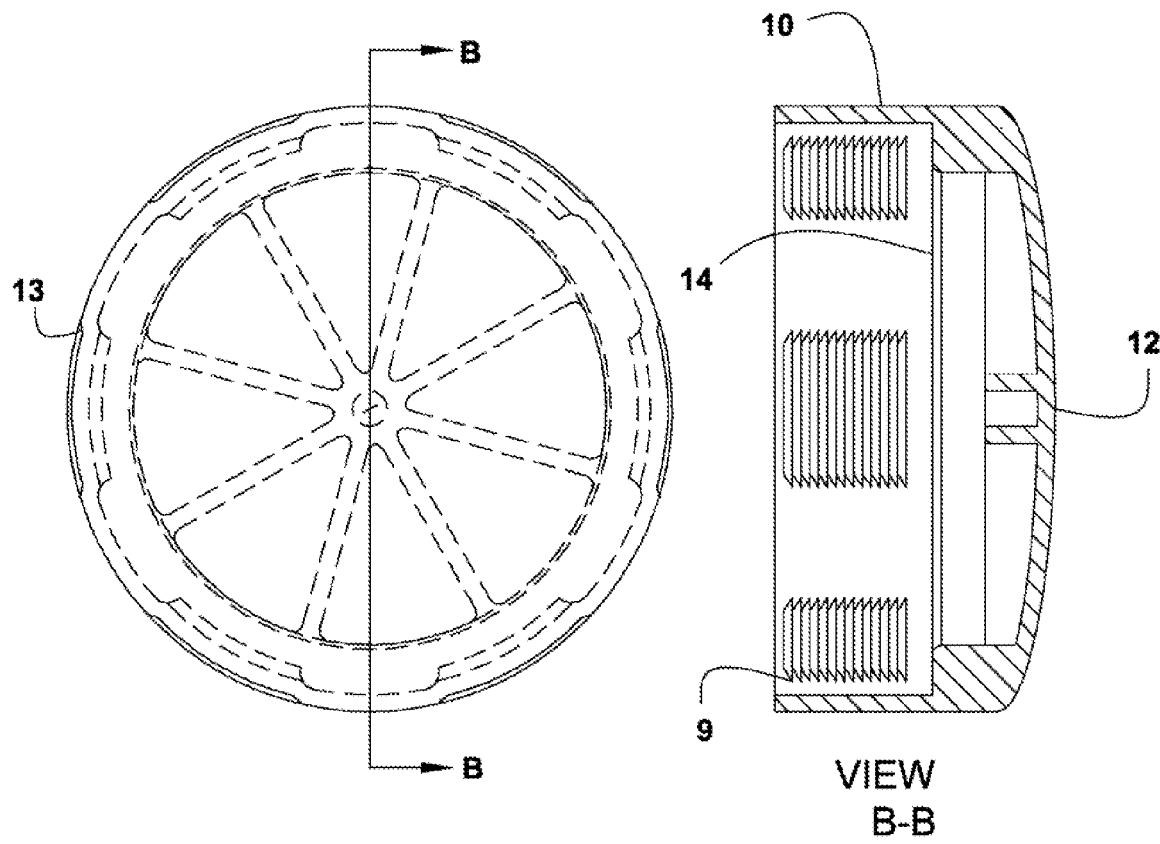
FIG. 3A is a top down internal view of the top piece shown in FIG. 1, rotated slightly from the view shown in FIG. 2A.
FIG. 3B is a cutaway view B-B corresponding to the B-B line shown in FIG. 3A.

The bottom piece is constructed with a diamond knurl (15) at its base for gripping, three ratcheting towers (5) including arc shaped teeth placed 120 degree's apart (Refer to FIG. 3), a center cylinder (7) to be the contact point for the lid (6) of the can to be compressed as well as three slots (8) along the circumference of the base of the device to allow fluid discharge (3). It will be appreciated that in alternate embodiments any suitable number of ratcheting towers (5) may be used. It will also be appreciated that the ratcheting towers may be comprised of any suitable material such as plastic or resin; and that the ratcheting towers (5) are adaptable to engage and hold griping teeth (9) shown in FIG. 1.

Referring to FIGS. 1, 2A, 2B, 2C, and 4A, 4B, and 4C; The following example is meant to illustrate operation of the invention and is not intended to be limiting. For example, a food can (4) such as a tuna can, may be opened by conventional means. The food can (4) is then placed into the upside down top piece (10) with the food can's lid still in place.

The bottom piece (2) is placed such that center cylinder (7) slightly engages the food can's opened lid and such that ratcheting towers (5) engage gripping teeth (9). It will be appreciated that pressure is maintained on the food can's lid by center cylinder (7) by gripping teeth (9) engaged with ratcheting towers (5). The assembled unit may be turned over and mated to a standard sink drain while more pressure is applied to top piece 10. It will be appreciated that the pressure is applied to ratchet the gripping teeth (9) down the ratcheting towers (5) towards the base of bottom piece (2). It will be appreciated that the pressure applied need only be applied long enough to ratchet the gripping teeth. Thereafter the pressure on the food can lid is maintained by gripping teeth (9) engaged with its respective ratchet tower (5) and cylinder (7). The food, in this example, is thus subject to a constant pressure which forces the liquid out where it drains conveniently down the drain. Thus, the invention overcomes the prior art where a difficult task for many people is to maintain a constant pressure by hand.

After a desired amount of draining, the gripping teeth (9) may be disengaged from its respective ratcheting tower (5) by simply turning the top (10) or bottom piece (2). This action will disengage the gripping teeth (9) horizontally from the ratcheting tower's (5) arc shaped teeth and top piece (10) may be lifted away. Or, before disengaging the top piece (10) the unit may be flipped and then disengaged, leaving the food can in the top piece cavity.

Slots (16) on the bottom of the bottom piece (2) on the outer ring which seats on the drain itself allow excess fluids in the sink to drain through the bottom piece by way of the sink drain. It is there to prevent fluid build up.

Figure 6:
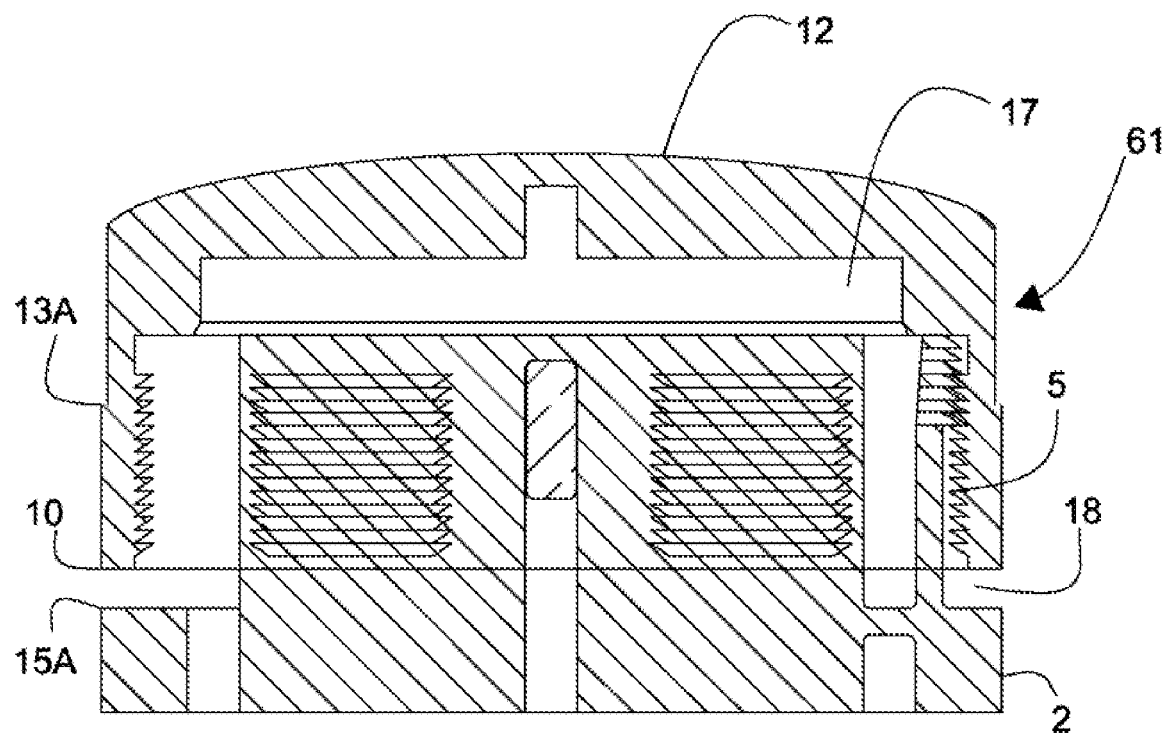
FIG. 6 is a sideways internal view of the invention shown in FIG. 1.

Referring to FIG. 6 there is shown a sideways internal view of an alternate embodiment of the invention shown in FIG. 1. Alignment marker (15A) on the circumference of the bottom piece (2) is used as a means to align the teeth for the bottom towers (5) with the position of the teeth (9) on the top piece (12). The top piece (12) is constructed with a similar marker such as (13A). When both the top and bottom piece are joined it is usually done by inserting the towers (5) from the bottom into the clearance positions on the top piece (9A—See FIG. 2B). Then the bottom piece is rotated 30 degrees to engage both the top and bottom gripping teeth (5 and 9 respectively, FIGS. 2B and 5B). The means for aligning the top and bottom is performed by the alignment of alignment marker (13A) on the top piece (12) and alignment marker (15A) on the bottom piece (2).

Still referring to FIG. 6, a clearance area (17) results from the full assembly (61) of both top and bottom pieces, (12 and 2), respectively. The purpose of the clearance area (17) is to prevent over compressing canned foods which become damaged due to over compression such as canned shrimps. The towers (5) when fully extended into the top piece (12) and acts as a stop. It will be appreciated that the clearance area (17) may be any suitable sized clearance area.

Another clearance area (18) is to prevent accidental pinching of fingers. The space (18) is built in so that if the tool is compressed with out a can installed in the tool with would not allow someone to pinch the fingers. The distance will become larger when an actual can is installed in the assembly (61). Depending on the food type the distance will vary.

It should be understood that the foregoing description is only illustrative of the invention. Accordingly, the present invention is intended to embrace all such alternatives, modifications and variances. For example, cylinder (7) shown in FIG. 4B may comprise a magnet 4B1 such that the food can (4) lid is removed when the bottom piece is lifted away.

What is claimed is:

1. A canned food pressing device comprising:
    a top piece, wherein the top piece having a cylinder shaped cavity adapted to conform to the shape of a circular can, and wherein the top piece comprises:
        at least one plurality of vertically aligned gripping teeth formed on an inner wall of the top piece;
    a bottom piece, wherein the bottom piece comprises:
        a base, a center cylinder extended from the base for pressing against a lid of the can, and at least one ratcheting tower extended from the base, the at least one ratcheting tower includes a plurality of vertically aligned arcing teeth, wherein the plurality of vertically aligned arcing teeth are adapted to mate with the at least one plurality of vertically aligned gripping teeth.

2. The canned food pressing device as in claim 1 wherein the canned food pressing device comprises food grade molded plastics.

3. The canned food pressing device as in claim 1 wherein the bottom piece further comprises at least one magnet for lifting a can lid.

4. The canned food pressing device as in claim 1 wherein the bottom piece further comprises a bottom alignment marker.

5. The canned food pressing device as in claim 4 wherein the top piece further comprises a top alignment marker for aligning with the bottom alignment marker indicating when the plurality of vertically aligned arcing teeth are aligned with the at least one plurality of vertically aligned gripping teeth.

6. The canned food pressing device as in claim 1 wherein the bottom piece further comprises at least one slot for excess fluids to drain through the bottom piece.

7. The canned food pressing device as in claim 1 further comprises a first gap between the top piece and the bottom piece for preventing over compressing canned foods.

8. The canned food pressing device as in claim 1 further comprises a second gap between the top piece and the bottom piece for preventing pinched fingers.

9. The canned food pressing device as in claim 1 wherein the top piece comprises a first gripping surface area adapted to fit the human hand to facilitate gripping and turning.

10. The canned food pressing device as in claim 9 wherein the first gripping surface area comprises a first knurled surface area.

11. The canned food pressing device as in claim 9 wherein the gripping surface area comprises a scalloped surface area.

12. The canned food pressing device as in claim 9 wherein the bottom piece comprises a second gripping surface area adapted to fit a human hand to facilitate gripping and turning.

13. The canned food pressing device as in claim 12 wherein the second gripping area comprises a second knurled surface area.

14. A canned food pressing device comprising:
    a top piece, wherein the top piece having a cylinder shaped cavity adapted to conform to the shape of a circular can, and wherein the top piece comprises:
        at least one plurality of vertically aligned gripping teeth formed on an inner wall of the top piece, and a top alignment marker;
    a bottom piece, wherein the bottom piece comprises:
        a base, a center cylinder extended from the base for pressing against a lid of the can, and at least one ratcheting tower extended from the base, the at least one ratcheting tower includes a plurality of vertically aligned arcing teeth, wherein the plurality of vertically aligned arcing teeth are adapted to mate with the at least one plurality of vertically aligned gripping teeth;
    at least one magnet for lifting a can lid; and
    a bottom alignment marker for aligning with the top alignment marker indicating when the plurality of vertically aligned arcing teeth are aligned with the at least one plurality of vertically aligned gripping teeth.

15. The canned food pressing device as in claim 14 wherein the canned food pressing device comprises non-stick surfaces.

16. The canned food pressing device as in claim 14 wherein the canned food pressing device comprises food grade molded plastics.

* * * * *